United States Patent
Zhang et al.

(10) Patent No.: US 9,474,037 B2
(45) Date of Patent: Oct. 18, 2016

(54) MOBILITY MANAGEMENT FOR LTE NETWORK FOR HIGH-SPEED RAILWAY

(71) Applicant: Empire Technology Development LLC, Wilmington, DE (US)

(72) Inventors: Jiayi Zhang, Beijing (CN); Haibo Wang, Beijing (CN)

(73) Assignee: Empire Technology Development LLC, Wilmington, DE (US)

( * ) Notice: Subject to any disclaimer, the term of this patent is extended or adjusted under 35 U.S.C. 154(b) by 114 days.

(21) Appl. No.: 14/130,017

(22) PCT Filed: Oct. 29, 2012

(86) PCT No.: PCT/CN2012/083686
§ 371 (c)(1),
(2) Date: Dec. 30, 2013

(87) PCT Pub. No.: WO2014/067049
PCT Pub. Date: May 8, 2014

(65) Prior Publication Data
US 2014/0342736 A1    Nov. 20, 2014

(51) Int. Cl.
*H04W 60/00* (2009.01)
*H04W 84/00* (2009.01)

(52) U.S. Cl.
CPC ........... *H04W 60/00* (2013.01); *H04W 84/005* (2013.01)

(58) Field of Classification Search
None
See application file for complete search history.

(56) References Cited

U.S. PATENT DOCUMENTS

| | | | |
|---|---|---|---|
| 2010/0029283 | A1 | 2/2010 | Iwamura |
| 2010/0113017 | A1* | 5/2010 | Bleckert et al. ............. 455/433 |
| 2010/0165836 | A1* | 7/2010 | Wahlqvist et al. ........... 370/225 |
| 2011/0075675 | A1* | 3/2011 | Koodli et al. ................ 370/401 |
| 2011/0096731 | A1* | 4/2011 | Kamalaraj et al. .......... 370/329 |
| 2011/0098051 | A1* | 4/2011 | Kamalaraj et al. .......... 455/450 |

(Continued)

FOREIGN PATENT DOCUMENTS

| | | |
|---|---|---|
| CN | 101489209 A | 7/2009 |
| CN | 102413569 A | 4/2012 |

(Continued)

OTHER PUBLICATIONS

International Search Report with Written Opinion for International Application No. PCT/CN2012/083686 mailed on Aug. 8, 2013.

(Continued)

*Primary Examiner* — Lester Kincaid
*Assistant Examiner* — Daniel G Bassett
(74) *Attorney, Agent, or Firm* — Brundidge & Stanger, P.C.

(57) ABSTRACT

In one aspect, a method may include grouping a plurality of wireless communication devices on a moving platform into two or more non-overlapping groups of the wireless communication devices, distributing a first list of tracking areas to the groups of the wireless communication devices, changing the first list of tracking areas to a second list of tracking areas for a first group of the wireless communication devices in response to the moving platform entering into an overlapping region between a first tracking area and a second tracking area of the first list of tracking areas, and changing the first list of tracking areas to the second list of tracking areas for a second group of the wireless communication devices in response to the moving platform entering into an overlapping region between the second tracking area and a third tracking area of the first list of tracking areas.

20 Claims, 6 Drawing Sheets

(56) References Cited

U.S. PATENT DOCUMENTS

| | | |
|---|---|---|
| 2012/0252451 A1 | 10/2012 | Knauft |
| 2012/0302240 A1* | 11/2012 | Tamaki et al. ............... 455/436 |
| 2013/0122908 A1* | 5/2013 | Zhao ............................ 455/436 |
| 2013/0130684 A1* | 5/2013 | Gomes et al. ............. 455/435.1 |
| 2013/0203415 A1* | 8/2013 | Arvidsson et al. ........ 455/435.1 |
| 2014/0226559 A1* | 8/2014 | Jactat et al. ................. 370/315 |
| 2014/0349570 A1* | 11/2014 | Pan et al. .................... 455/11.1 |

FOREIGN PATENT DOCUMENTS

| | | | |
|---|---|---|---|
| CN | 102523569 A | | 6/2012 |
| CN | 102572782 A | * | 7/2012 |
| EP | 2375835 A1 | | 10/2011 |
| WO | 2011038783 A1 | | 4/2011 |

OTHER PUBLICATIONS

3GPP TS 23.401 version 10.4.0 Release 10, "General Packet Radio Service (GPRS) Enhancements for Evolved Universal Terrestrial Radio Access Network (E-UTRAN) access", 2011.

"Distance Based Registration", 3GPP TSG-RAN2 Meeting #50 R2-060056, Sophia Antipolis, France, Jan. 9-13, 2006.

"Discussion on Configuration of Tracking Area", 3GPP TSG-RAN WG3 #51 Meeting, Denver, Colorado, USA, Feb. 13-Feb. 18, 2006, R3-060148.

* cited by examiner

MOBILITY MANAGEMENT FOR LTE NETWORK FOR HIGH-SPEED RAILWAY

CROSS-REFERENCE TO RELATED APPLICATION

The present application is a U.S. national stage filing under 35 U.S.C. § 371of International Application No. PCT/CN12/83686, filed on Oct. 29, 2012.

BACKGROUND

With the rapid development and deployment of high-speed railway around the world, it has become imperative for service providers to provide broadband wireless access for passengers on trains moving at high speeds. During a journey up to several hours, passengers on any such train may desire to use various broadband wireless services including voice, email, web browsing, multimedia services, etc. The passengers may use user equipment (UE) such as smartphones, for example, to access various broadband wireless services.

In a Long Term Evolution (LTE) network, tracking areas (TA) are used as a way to track UE location in idle mode. A tracking area includes a cluster of radio base stations having the same tracking area code (TAC). A mobility management entity (MME) uses TA information when paging idle UE to send notification of incoming data transmission(s). The MME provides the UE with a list of tracking areas, or TA list, where the UE registration is valid. When the MME pages a UE, a paging message is sent to all radio base stations in the TA list.

FIG. 1 shows a scheme 100 of mobility management for a broadband wireless network for high-speed railway. According to conventional scheme 100, the TA tracking area (TA) update for the wireless communication devices on a moving platform 150 may be carried out for all the wireless communication devices 140 on the moving platform 150 when the moving platform 150 enters into an overlapping region between two TAs. Accordingly, the time available for the TA update procedure for each wireless communication device on the moving platform 150 when the moving platform 150, $T_{TAU}$, is in an overlapping region between two TAs is approximately 3.7 milliseconds, the calculation of which is as follows:

$$T_{TAU} = \frac{L}{V \times U} = \frac{200 \times 3600}{350 \times 10^3 \times 557} \approx 3.7 \text{ ms}$$

SUMMARY

By at least one embodiment, a method may include grouping a plurality of wireless communication devices on a moving platform into two or more non-overlapping groups of the wireless communication devices, distributing a first list of tracking areas to the groups of the wireless communication devices, changing the first list of tracking areas to a second list of tracking areas for a first group of the wireless communication devices in response to the moving platform entering into an overlapping region between a first tracking area and a second tracking area of the first list of tracking areas, and changing the first list of tracking areas to the second list of tracking areas for a second group of the wireless communication devices in response to the moving platform entering into an overlapping region between the second tracking area and a third tracking area of the first list of tracking areas.

This Summary is submitted with the understanding that it will not be used to interpret or limit the scope or meaning of the claims. This Summary is not intended to identify key features or essential features of the claimed subject matter, nor is it intended to be used as an aid in determining the scope of the claimed subject matter.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
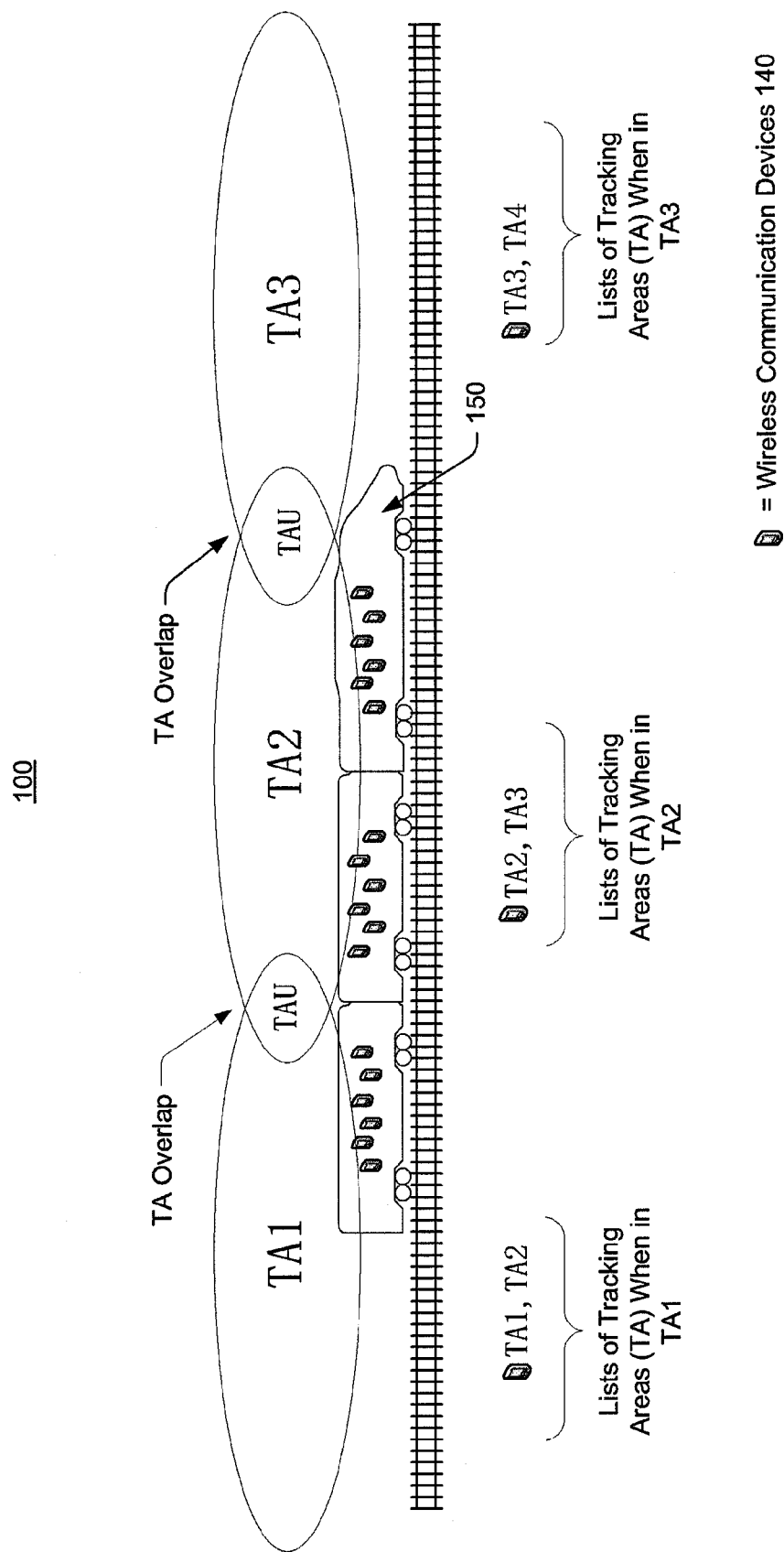
FIG. 1 shows an example scheme of mobility management for a broadband wireless network for high-speed railway, arranged in accordance with embodiments described herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, may be arranged, substituted, combined, separated, and designed in a wide variety of different configurations, all of which are explicitly contemplated herein.

Described herein are systems, apparatuses, computer program products, methods, and techniques related to mobility management for broadband wireless access for high-speed railway. The implementations of mobility management described herein include grouping a plurality of wireless communication devices, e.g., user equipment, on a moving platform, e.g., a high-speed train, into two or more non-overlapping groups of the wireless communication devices. That is, each of the wireless communication devices on the moving platform may belong to a respective one of the two or more groups. Initially, a first TA list may be distributed to the groups of the wireless communication devices. Subsequent TA update may be carried out in a staggered manner such that TA update for the wireless communication devices on the moving platform is carried out for one subset of the wireless communication devices, i.e., those belonging to one TA, at a time. Consequently, the proposed technique advantageously may reduce delay in tracking area updates as well as system transient load.

Overview

Figure 2:
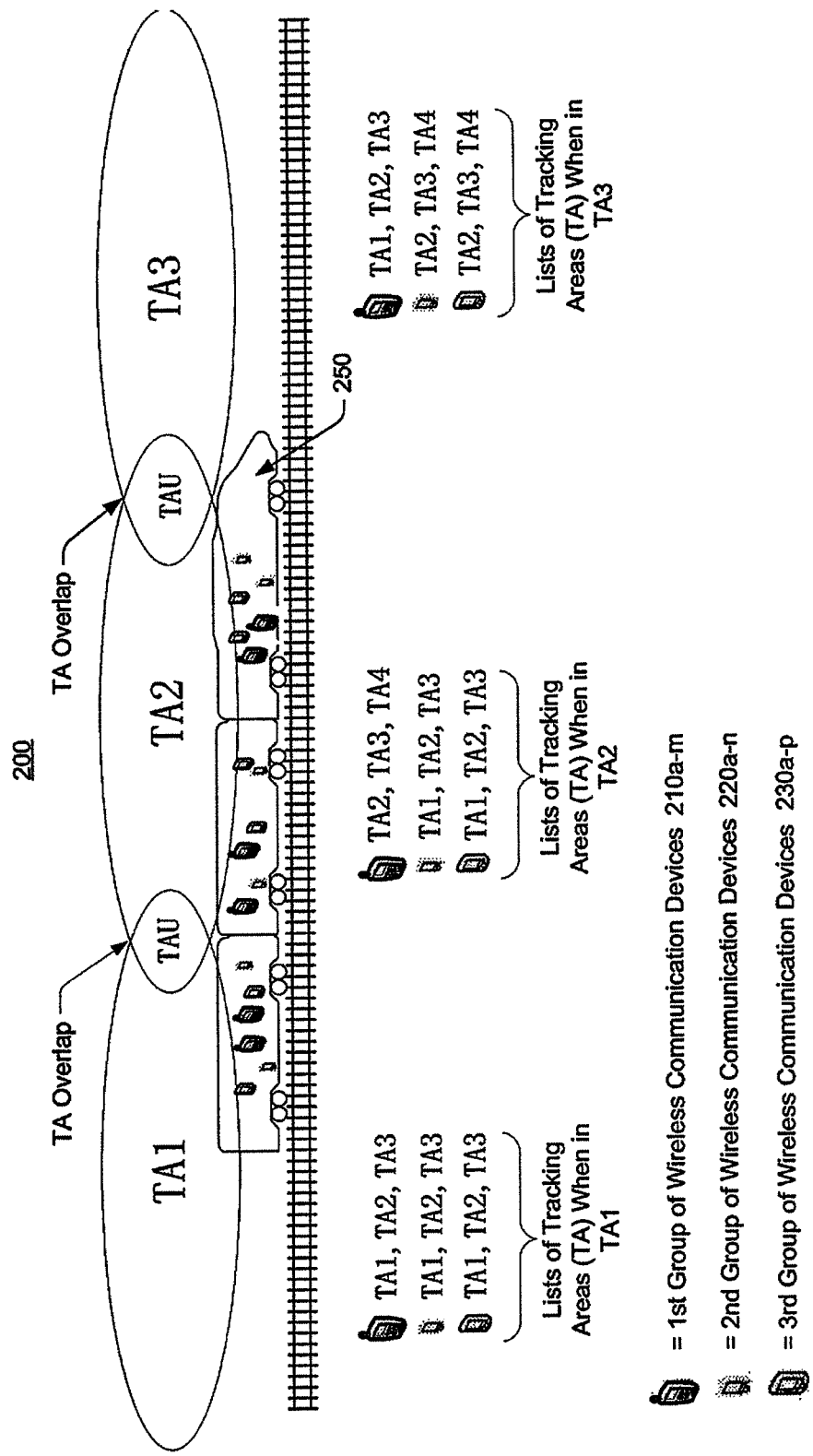
FIG. 2 shows a conventional scheme of mobility management for a broadband wireless network for high-speed railway.

FIG. 2 shows an example scheme 200 of mobility management for a broadband wireless network for high-speed railway, arranged in accordance with embodiments described herein.

Referring to FIG. 2, under scheme 200, numerous user equipment (hereinafter interchangeably referred to as "wireless communication devices 210a-m, 220a-n, 230a-p"), used by passengers of a moving platform 250, may be carried on and moving with the moving platform 250. As shown in FIG. 1, the moving platform 250 may be a train, e.g., high-speed train, with multiple cars. When a UE enters a cell with a TAC not in the current TA list provided to the UE, such as when the moving platform 250 carrying the wireless communication devices 210a-m, 220a-n, 230a-p travels form one TA to another, a procedure known as the a TA update (TAU) occurs. The TA list makes it possible to avoid frequent TA updates due to Ping-Pong effects along TA borders. This is achievable by including an old TA in a new TA list that is received by a UE during TA update. Assuming the numerous wireless communication devices 210a-m, 220a-n, 230a-p shown in FIG. 2 are capable of broadband wireless communications, e.g., in accordance with the LTE-A standard, the numerous wireless communication devices 210a-m, 220a-n, 230a-p may carry out TA update at the boundary of a given TA, e.g., in an overlapping region of between two TAs.

As a non-limiting example shown in FIG. 2, the numerous wireless communication devices 210a-m, 220a-n, 230a-p on the moving platform 250 may be grouped into two or more non-overlapping groups, namely a first group 210a-m of a number of wireless communication devices 210a, 210b, . . . 210m, a second group 220a-n of a number of wireless communication devices 220a, 220b, . . . 220n, and a third group 230a-p of a number of wireless communication devices 230a, 230b, . . . 230p. That is, each of the numerous wireless communication devices 210a-m, 220a-n, and 230a-p on the moving platform 250 may belong to one of the first group 210a-m, the second group 220a-n, and third group 230a-p. As shown in FIG. 2, wireless communication devices of a given group may be scattered in each of the multiple cars of the moving platform 250. When a given UE is in an idle state, it may send a request for attachment to a mobility management entity (MME), which in turn may register the current TA location for the UE. The MME may allocate a respective Globally Unique Temporary Identifier (GUTI) to each of the numerous wireless communication devices of the three groups of wireless communication devices on the moving platform.

When the moving platform 250 is within the coverage of a first tracking area TA1, the TA list kept by each wireless communication device in the three groups of wireless communication devices 210a-m, 220a-n, 230a-p may be the same and include the first tracking area TA1, a second tracking area TA2 and a third tracking area TA3 ({TA1, TA2, TA3}). The MME may send a paging message to radio base station groups in the TA list. When the moving platform 250 enters into an overlapping region between the first tracking area TA1 and the second tracking area TA2, TA update may be carried out for the wireless communication devices of the first group 210a-m to change the TA list kept by the wireless communication devices of the first group 210a-m to {TA2, TA3, TA4}. Meanwhile, no TA update is carried out for the wireless communication devices of the second group 220a-n or the third group 230a-p. By carrying out TA update for one group of the wireless communication devices 210a-m, 220a-n, 230a-p (here, the first group 210a-m), rather than for some or all of the groups, as the moving platform 250 crosses an overlapping region between two tracking areas, a phenomenon known as signaling storm may be avoided. Otherwise, signaling storm, which entails a surge in system transient load, may occur as TA update is initiated for each one of the wireless communication devices 210a-m, 220a-n, and 230a-p. Consequently, negative impact on quality of service for the wireless communication devices 210a-m, 220a-n, and 230a-p due to signaling storm may be avoided.

When the moving platform 250 enters into an overlapping region between the second tracking area TA2 and the third tracking area TA3, TA update may be carried out for the wireless communication devices of the second group 220a-n to change the TA list kept by the wireless communication devices of the second group 220a-n to {TA2, TA3, TA4}. Meanwhile, no TA update is carried out for the wireless communication devices of the first group 210a-m or the third group 230a-p. Again, by carrying out TA update for one group of the wireless communication devices 210a-m, 220a-n, 230a-p(here, the second group 220a-n), rather than for some or all of the groups, a signaling storm may be avoided as the moving platform 250 crosses an overlapping region between two tracking areas.

When the moving platform 250 enters into an overlapping region between the third tracking area TA3 and a fourth tracking area TA4, TA update may be carried out for the wireless communication devices of the third group 230a-p to change the TA list kept by the wireless communication devices of the third group 230a-p to {TA3, TA4, TA5}. Meanwhile, no TA update is carried out for the wireless communication devices of the first group 210a-m or the second group 220a-n. Once again, by carrying out TA update for one group of the wireless communication devices 210a-m, 220a-n, 230a-p(here, the second group 230a-p), instead of some or all of the groups, a signaling storm may be avoided as the moving platform 250 crosses an overlapping region between two tracking areas.

The above-described TA update procedure may be carried out for one group of the wireless communication devices 210a-m, 220a-n, and 230a-p when the moving platform 250 travels from one tracking area to another. Rather than having all the wireless communication devices 210a-m, 220a-n, 230a-p on the moving platform 250 undergo the TA update procedure as the moving platform 250 enters into an overlapping region between two TAs, TA update may be limited to wireless communication devices of one of numerous non-overlapping groups of the wireless communication devices 210a-m, 220a-n, 230a-p on the moving platform 250.

To illustrate, in a non-limiting example, it may be assumed that the moving platform 250 has eight cars and a total length of 200 m, carries 557 passengers who use wireless communication devices for broadband wireless access during the journey, and has a maximum operating speed of 350 km/h. Accordingly, the time available for the TA update procedure for each wireless communication device on the moving platform 250 when the moving platform 250, denoted mathematically as $T'_{TAU}$, is in an overlapping region between two TAs may be approximately 11.08 milliseconds, the calculation of which is as follows:

$$T'_{TAU} = \frac{L}{V \times U'} = \frac{200 \times 3600 \times 3}{350 \times 10^3 \times 557} \approx 11.08 \text{ ms}$$

The time available for TA update in the example under scheme 200, $T'_{TAU}$, is about three times that of the time available for TA update under scheme 100, $T_{TAU}$. In other words, as there is more time available for TA update under scheme 200, signaling storm and the delay in tracking area updates, as well as system transient load, can be avoided. Therefore, by grouping wireless communication devices on a moving platform into multiple groups and performing TA update for one group, rather than for the multiple groups, as the moving platform crosses an overlapping region between two adjacent tracking areas, quality of service for the wireless communication devices on the moving platform may be preserved.

Exemplary Processes

Figure 3:
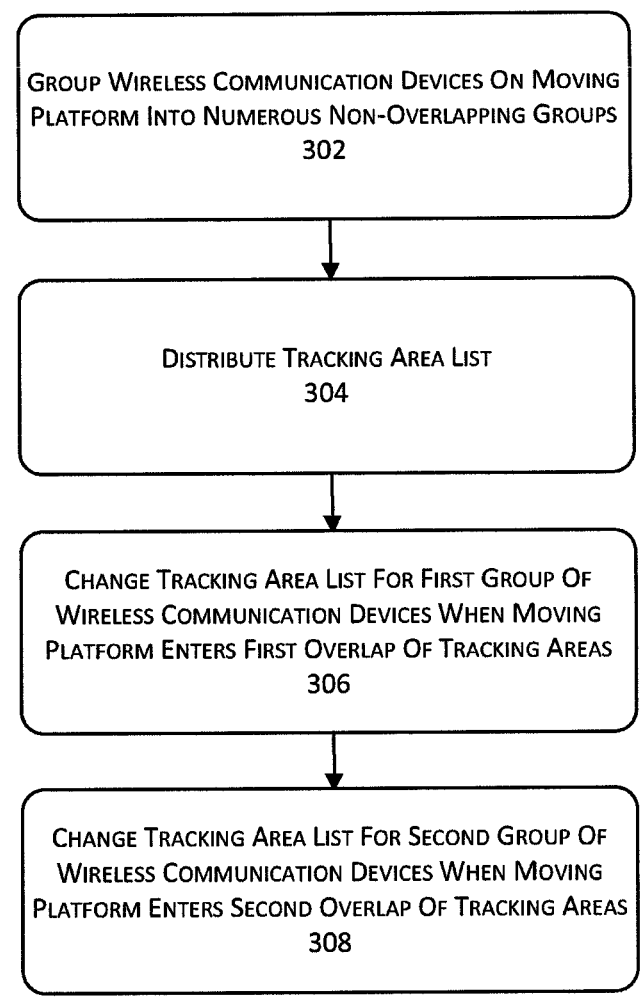
FIG. 3 shows a processing flow in accordance with one or more embodiments of a mobility management method for a broadband wireless network for high-speed railway, arranged in accordance with embodiments described herein.

FIG. 3 shows a processing flow 300 in accordance with one or more embodiments of a mobility management method for a broadband wireless network for high-speed railway, arranged in accordance with embodiments described herein.

Example processing flow 300 includes one or more operations, actions, or functions as illustrated by one or more of blocks 302, 304, 306 and 308. Although illustrated as discrete blocks, various blocks may be divided into additional blocks, combined into fewer blocks, or eliminated, depending on the desired implementation. Further, processing flow 300 may be implemented in an MME, a radio base station associated with the MME, a central office associated with the radio base station, and/or an example computing device 600, to be described below. Processing flow 300 may begin at block 302.

Block 302 (Group Wireless Communication Devices On Moving Platform Into Numerous Non-Overlapping Groups) may include grouping a plurality of wireless communication devices on a moving platform into two or more non-overlapping groups of the wireless communication devices. For example, referring to FIG. 2, an MME, a radio base station, a central office, or a computing device may group the wireless communication devices on the moving platform into, e.g., three non-overlapping groups, namely a first group, a second group, and a third group. Processing flow 300 may proceed from block 302 to block 304.

Block 304 (Distribute Tracking Area List) may include distributing a first list of tracking areas to the groups of the wireless communication devices. For example, the MME, radio station, central office, or computing device may transmit a first TA list to the wireless communication devices on the moving platform. Processing flow 300 may proceed from block 304 to block 306.

Block 306 (Change Tracking Area List For First Group Of Wireless Communication Devices When Moving Platform Enters First Overlap Of Tracking Areas) may include changing the first list of tracking areas to a second list of tracking areas for a first group of the wireless communication devices in response to the moving platform entering into an overlapping region between a first tracking area and a second tracking area of the first list of tracking areas. For example, when the moving platform enters into an overlapping region between the first tracking area TA1 and the second tracking area TA2, TA update may be carried out for the wireless communication devices of the first group to change the TA list kept by the wireless communication devices of the first group to {TA2, TA3, TA4}. Meanwhile, no TA update is carried out for the wireless communication devices of the second group or the third group. Processing flow 300 may proceed from block 306 to block 308.

Block 308 (Change Tracking Area List For Second Group Of Wireless Communication Devices When Moving Platform Enters Second Overlap Of Tracking Areas) may include changing the first list of tracking areas to the second list of tracking areas for a second group of the wireless communication devices in response to the moving platform entering into an overlapping region between the second tracking area and a third tracking area of the first list of tracking areas. For example, when the moving platform enters into an overlapping region between the second tracking area TA2 and the third tracking area TA3, TA update may be carried out for the wireless communication devices of the second group to change the TA list kept by the wireless communication devices of the second group to {TA2, TA3, TA4}. Meanwhile, no TA update is carried out for the wireless communication devices of the first group or the third group.

In at least some embodiments, the plurality of wireless communication devices may comprise a plurality of active and idle wireless communication devices on the moving platform that may be configured to communicate in accordance with the LTE standard.

In at least some embodiments, grouping the plurality of wireless communication devices on the moving platform into the two or more non-overlapping groups of the wireless communication devices may comprise allocating a respective Globally Unique Temporary Identifier (GUTI) to each of the wireless communication devices, and assigning each of the wireless communication devices to a respective group of the two or more groups by identifying each of the wireless communication devices with the respective GUTI.

In at least some embodiments, processing flow 300 may also include changing the first list of tracking areas to a third list of tracking areas, which is different from the first list and the second list of tracking areas, for a third group of the wireless communication devices when the moving platform enters into an overlapping region between the third tracking area of the first list of tracking areas and a fourth tracking area of the second list of tracking areas. In at least some embodiments, processing flow 300 may additionally include changing the second list of tracking areas to the third list of tracking areas for the first group of the wireless communication devices when the moving platform enters into an overlapping region between the fourth tracking area and a fifth tracking area of the second list of tracking areas. In at least some embodiments, processing flow 300 may further include changing the second list of tracking areas to a fourth list of tracking areas, which is different from the first, the second, and the third list of tracking areas, for the second group of the wireless communication devices when the moving platform enters into an overlapping region between the fifth tracking area of the second list of tracking areas and a sixth tracking area of the fourth list of tracking areas.

In at least some embodiments, processing flow 300 may further include paging one or more radio base stations associated with one or more tracking areas of the first or second list of tracking areas when the moving platform enters a respective tracking are of the first or second list of tracking areas.

For illustrative purpose, a non-limiting example with respect to FIG. 3 is provided herein. In this example, referring to FIG. 2, a moving platform may carry numerous wireless communication devices that are grouped into, e.g., three non-overlapping groups, e.g., by allocating each wireless communication device a unique GUTI. In this example, when the moving platform is within the coverage of a first tracking area TA1, the TA list kept by each wireless communication device in the three groups of wireless communication devices may be the same and include the first tracking area TA1, a second tracking area TA2, and a third tracking area TA3 ({TA1, TA2, TA3}). The MME may send a paging message to radio base station groups in the TA list. When the moving platform enters into an overlapping region between the first tracking area TA1 and the second tracking area TA2, TA update may be carried out for the wireless communication devices of the first group to change the TA list kept by the wireless communication devices of the first group to {TA2, TA3, TA4}. Meanwhile, no TA update is carried out for the wireless communication devices of the second group or the third group. By carrying out TA update for one group of the wireless communication devices, rather than for some or all of the groups, a signaling storm may be avoided as the moving platform crosses an overlapping region between two tracking areas. Consequently, any negative impact on quality of service for the wireless communication devices due to signaling storm may be avoided as well.

When the moving platform enters into an overlapping region between the second tracking area TA2 and the third tracking area TA3, TA update may be carried out for the wireless communication devices of the second group to change the TA list kept by the wireless communication devices of the second group to {TA2, TA3, TA4}. Meanwhile, no TA update is carried out for the wireless communication devices of the first group or the third group.

When the moving platform enters into an overlapping region between the third tracking area TA3 and a fourth tracking area TA4, TA update may be carried out for the wireless communication devices of the third group to change the TA list kept by the wireless communication devices of the third group to {TA3, TA4, TA5}. Meanwhile, no TA update is carried out for the wireless communication devices of the first group or the second group.

Figure 4:
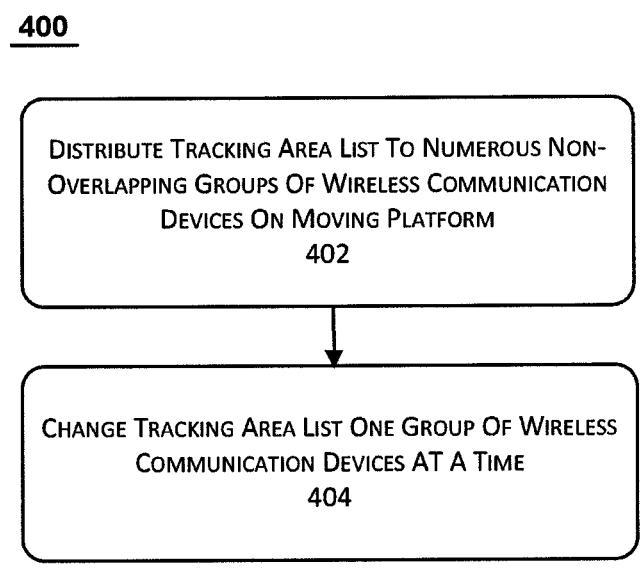
FIG. 4 shows another processing flow in accordance with one or more embodiments of a mobility management method for a broadband wireless network for high-speed railway, arranged in accordance with embodiments described herein.

FIG. 4 shows a processing flow 400 in accordance with one or more embodiments of a mobility management method for a broadband wireless network for high-speed railway, arranged in accordance with embodiments described herein.

Example processing flow 400 may include one or more operations, actions, or functions as illustrated by one or more of blocks 402 and 404. Although illustrated as discrete blocks, various blocks may be divided into additional blocks, combined into fewer blocks, or eliminated, depending on the desired implementation. Further, processing flow 400 may be implemented in an MME, a radio base station associated with the MME, a central office associated with the radio base station, and/or an example computing device 600, to be described below. Processing flow 400 may begin at block 402.

Block 402 (Distribute Tracking Area List To Numerous Non-Overlapping Groups of Wireless Communication Devices On Moving Platform) may include distributing, to a plurality of non-overlapping groups of wireless communication devices on a moving platform, a first list of tracking areas that are available for communication with the wireless communication devices. Respective wireless communication devices in each one of the groups are different from respective wireless communication devices in each other one of the groups. For example, referring to FIG. 2, an MME, a radio base station, a central office, or a computing device may group the wireless communication devices on the moving platform into, e.g., three non-overlapping groups, namely a first group, a second group, and a third group. The MME, radio station, central office, or computing device transmits a first TA list to the wireless communication devices on the moving platform. Processing flow 400 may proceed from block 402 to block 404.

Block 404 (Change Tracking Area List One Group Of Wireless Communication Devices At A Time) may include changing the first list of tracking areas to a second list of tracking areas for the groups of wireless communication devices in a sequential manner one group of the groups of wireless communication devices at a time as the moving platform travels through one or more overlapping regions between one or more pairs of a plurality of tracking areas. For example, when the moving platform enters into an overlapping region between the first tracking area TA1 and the second tracking area TA2, TA update may be carried out for the wireless communication devices of the first group to change the TA list kept by the wireless communication devices of the first group to {TA2, TA3, TA4}. Meanwhile, no TA update is carried out for the wireless communication devices of the second group or the third group.

Later, when the moving platform enters into an overlapping region between the second tracking area TA2 and the third tracking area TA3, TA update may be carried out for the wireless communication devices of the second group to change the TA list kept by the wireless communication devices of the second group to {TA2, TA3, TA4}. Meanwhile, no TA update is carried out for the wireless communication devices of the first group or the third group.

In at least some embodiments, processing flow 400, as executed by an MME for example, may change the first list of tracking areas to the second list of tracking areas for a first group of the wireless communication devices in response to the moving platform entering into an overlapping region between a first tracking area and a second tracking area of the first list of tracking areas. Processing flow 400, as executed by an MME for example, may also change the first list of tracking areas to the second list of tracking areas for a second group of the wireless communication devices in response to the moving platform entering into an overlapping region between the second tracking area and a third tracking area of the first list of tracking areas.

In at least some embodiments, processing flow 400, as executed by an MME for example, may also include changing the first list of tracking areas to a third list of tracking areas, which is different from the first list and the second list of tracking areas, for a third group of the wireless communication devices, when the moving platform entering into an overlapping region between the third tracking area of the first list of tracking areas and a fourth tracking area of the second list of tracking areas. In at least some embodiments, processing flow 400 may additionally include changing the second list of tracking areas to the third list of tracking areas for the first group of the wireless communication devices, when the moving platform entering into an overlapping region between the fourth tracking area and a fifth tracking area of the second list of tracking areas. In at least some embodiments, processing flow 400 may further include changing the second list of tracking areas to a fourth list of tracking areas, which is different from the first, the second, and the third list of tracking areas, for the second group of the wireless communication devices, when the moving platform entering into an overlapping region between the fifth tracking area of the second list of tracking areas and a sixth tracking area of the fourth list of tracking areas.

In at least some embodiments, processing flow 400 may further include paging one or more radio base stations associated with one or more tracking areas of the first or second list of tracking areas in response to the moving platform entering a respective tracking are of the first or second list of tracking areas.

In at least some embodiments, the plurality of groups of wireless communication devices may comprise a plurality of active and idle wireless communication devices on the moving platform that are configured to communicate in accordance with the LTE standard.

For illustrative purpose, an example with respect to FIG. 4 is provided herein. In this example, referring to FIG. 2, a moving platform carries numerous wireless communication devices that are grouped into, e.g., three non-overlapping groups, e.g., by allocating each wireless communication device a unique GUTI. In this example, when the moving platform is within the coverage of a first tracking area TA1, the TA list kept by each wireless communication device in the three groups of wireless communication devices may be the same and include the first tracking area TA1, a second tracking area TA2, and a third tracking area TA3 ({TA1, TA2, TA3}). The MME may send a paging message to radio base station groups in the TA list. When the moving platform enters into an overlapping region between the first tracking area TA1 and the second tracking area TA2, TA update may be carried out for the wireless communication devices of the first group to change the TA list kept by the wireless communication devices of the first group to {TA2, TA3, TA4}. Meanwhile, no TA update is carried out for the wireless communication devices of the second group or the third group. By carrying out TA update for one group of the wireless communication devices, rather than some or all of the groups, a signaling storm may be avoided as the moving platform crosses an overlapping region between two tracking areas. Consequently, any negative impact on quality of service for the wireless communication devices due to signaling storm may be avoided as well.

When the moving platform enters into an overlapping region between the second tracking area TA2 and the third tracking area TA3, TA update may be carried out for the wireless communication devices of the second group to change the TA list kept by the wireless communication devices of the second group to {TA2, TA3, TA4}. Meanwhile, no TA update is carried out for the wireless communication devices of the first group or the third group.

When the moving platform enters into an overlapping region between the third tracking area TA3 and a fourth tracking area TA4, TA update may be carried out for the wireless communication devices of the third group to change the TA list kept by the wireless communication devices of the third group to {TA3, TA4, TA5}. Meanwhile, no TA update is carried out for the wireless communication devices of the first group or the second group.

Figure 5:
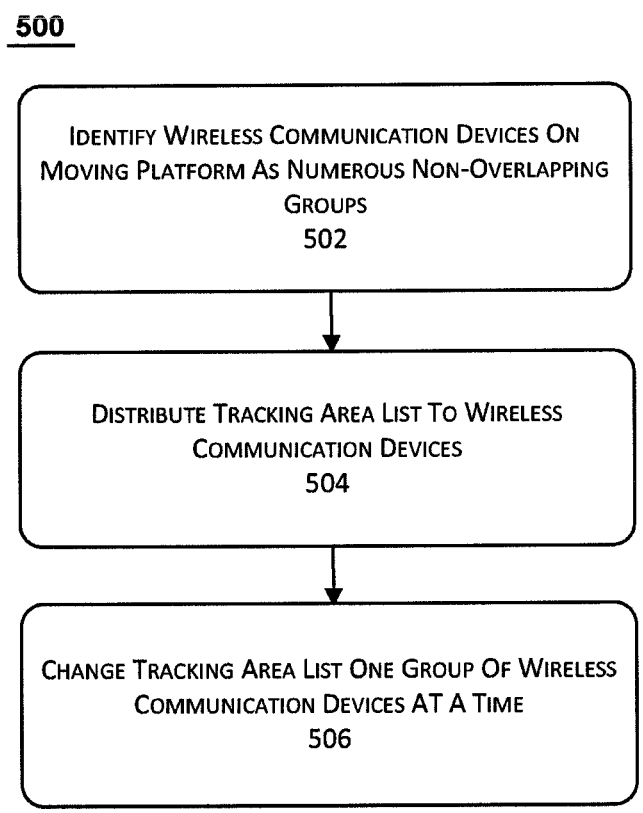
FIG. 5 shows yet another processing flow in accordance with one or more embodiments of a mobility management method for a broadband wireless network for high-speed railway, arranged in accordance with embodiments described herein.

FIG. 5 shows a processing flow 500 in accordance with one or more embodiments of a mobility management method for a broadband wireless network for high-speed railway, arranged in accordance with embodiments described herein.

Example processing flow 500 may include one or more operations, actions, or functions as illustrated by one or more of blocks 502, 504 and 506. Although illustrated as discrete blocks, various blocks may be divided into additional blocks, combined into fewer blocks, or eliminated, depending on the desired implementation. Further, processing flow 500 may be implemented in an MME, a radio base station associated with the MME, a central office associated with the radio base station, and/or an example computing device 600, to be described below. Processing flow 500 may begin at block 502.

Block 502 (Identify Wireless Communication Devices On Moving Platform As Numerous Non-Overlapping Groups) may include identifying a plurality of wireless communication devices on a moving platform as two or more non-overlapping groups of the wireless communication devices using respective Globally Unique Temporary Identifiers (GUTIs) of the wireless communication devices. For example, referring to FIG. 2, wireless communication devices on a moving platform may be grouped into, e.g., three non-overlapping groups, namely a first group, a second group, and a third group. The MME may allocate a respective GUTI to each of the numerous wireless communication devices of the three groups of wireless communication devices on the moving platform. Processing flow 500 may proceed from block 502 to block 504.

Block 504 (Distribute Tracking Area List To Wireless Communication Devices) may include distributing a first list of tracking areas to the groups of the wireless communication devices. For example, the MME, radio station, central office, or computing device transmits a first TA list to the wireless communication devices on the moving platform. Processing flow 500 may proceed from block 504 to block 506.

Block 506 (Change Tracking Area List One Group Of Wireless Communication Devices At A Time) may include changing the first list of tracking areas to a second list of tracking areas for the groups of wireless communication devices in a sequential manner one group of the groups of wireless communication devices at a time as the moving platform travels through one or more overlapping regions between one or more pairs of a plurality of tracking areas.

In at least some embodiments, processing flow 500, as executed by, e.g., an MME, may change the first list of tracking areas to a second list of tracking areas for a first group of the wireless communication devices, when the moving platform enters into an overlapping region between a first tracking area and a second tracking area of the first list of tracking areas. Processing flow 500, as executed by, e.g., an MME, may also change the first list of tracking areas to the second list of tracking areas for a second group of the wireless communication devices, when the moving platform enters into an overlapping region between the second tracking area and a third tracking area of the first list of tracking areas. For example, when the moving platform enters into an overlapping region between the first tracking area TA1 and the second tracking area TA2, TA update may be carried out for the wireless communication devices of the first group to change the TA list kept by the wireless communication devices of the first group to {TA2, TA3, TA4}. Meanwhile, no TA update is carried out for the wireless communication devices of the second group or the third group.

Later, when the moving platform enters into an overlapping region between the second tracking area TA2 and the third tracking area TA3, TA update may be carried out for the wireless communication devices of the second group to change the TA list kept by the wireless communication devices of the second group to {TA2, TA3, TA4}. Meanwhile, no TA update is carried out for the wireless communication devices of the first group or the third group.

In at least some embodiments, processing flow 500 may also include changing the first list of tracking areas to a third list of tracking areas, which is different from the first list and the second list of tracking areas, for a third group of the wireless communication devices, when the moving platform entering into an overlapping region between the third tracking area of the first list of tracking areas and a fourth tracking area of the second list of tracking areas. In at least some further embodiments, processing flow 500 may additionally include changing the second list of tracking areas to the third list of tracking areas for the first group of the wireless communication devices, when the moving platform enters into an overlapping region between the fourth tracking area and a fifth tracking area of the second list of tracking areas. In at least some still further embodiments, processing flow 500 may further include changing the second list of tracking areas to a fourth list of tracking areas, which is different from the first, the second, and the third list of tracking areas, for the second group of the wireless communication devices, when the moving platform enters into an overlapping region between the fifth tracking area of the second list of tracking areas and a sixth tracking area of the fourth list of tracking areas.

In at least some embodiments, the plurality of wireless communication devices may comprise a plurality of active and idle wireless communication devices on the moving platform that are configured to communicate in accordance with the LTE standard.

For illustrative purpose, an example with respect to FIG. 5 is provided herein. In this example, referring to FIG. 2, a moving platform carries numerous wireless communication devices that are grouped into, e.g., three non-overlapping groups, e.g., by allocating each wireless communication device a unique GUTI. In this example, when the moving platform is within the coverage of a first tracking area TA1, the TA list kept by each wireless communication device in the three groups of wireless communication devices may be the same and include the first tracking area TA1, a second tracking area TA2 and a third tracking area TA3 ({TA1, TA2, TA3}). The MME sends a paging message to radio base station groups in the TA list. When the moving platform enters into an overlapping region between the first tracking area TA1 and the second tracking area TA2, TA update may be carried out for the wireless communication devices of the first group to change the TA list kept by the wireless communication devices of the first group to {TA2, TA3, TA4}. Meanwhile, no TA update is carried out for the wireless communication devices of the second group or the third group. By carrying out TA update for one group of the wireless communication devices as the moving platform crosses an overlapping region between two tracking areas, signaling storm may be avoided. Consequently, any negative impact on quality of service for the wireless communication devices due to signaling storm may be avoided as well.

When the moving platform enters into an overlapping region between the second tracking area TA2 and the third tracking area TA3, TA update may be carried out for the wireless communication devices of the second group to change the TA list kept by the wireless communication devices of the second group to {TA2, TA3, TA4}. Meanwhile, no TA update is carried out for the wireless communication devices of the first group or the third group.

When the moving platform enters into an overlapping region between the third tracking area TA3 and a fourth tracking area TA4, TA update may be carried out for the wireless communication devices of the third group to change the TA list kept by the wireless communication devices of the third group to {TA3, TA4, TA5}. Meanwhile, no TA update is carried out for the wireless communication devices of the first group or the second group.

Exemplary Computing Device

Figure 6:
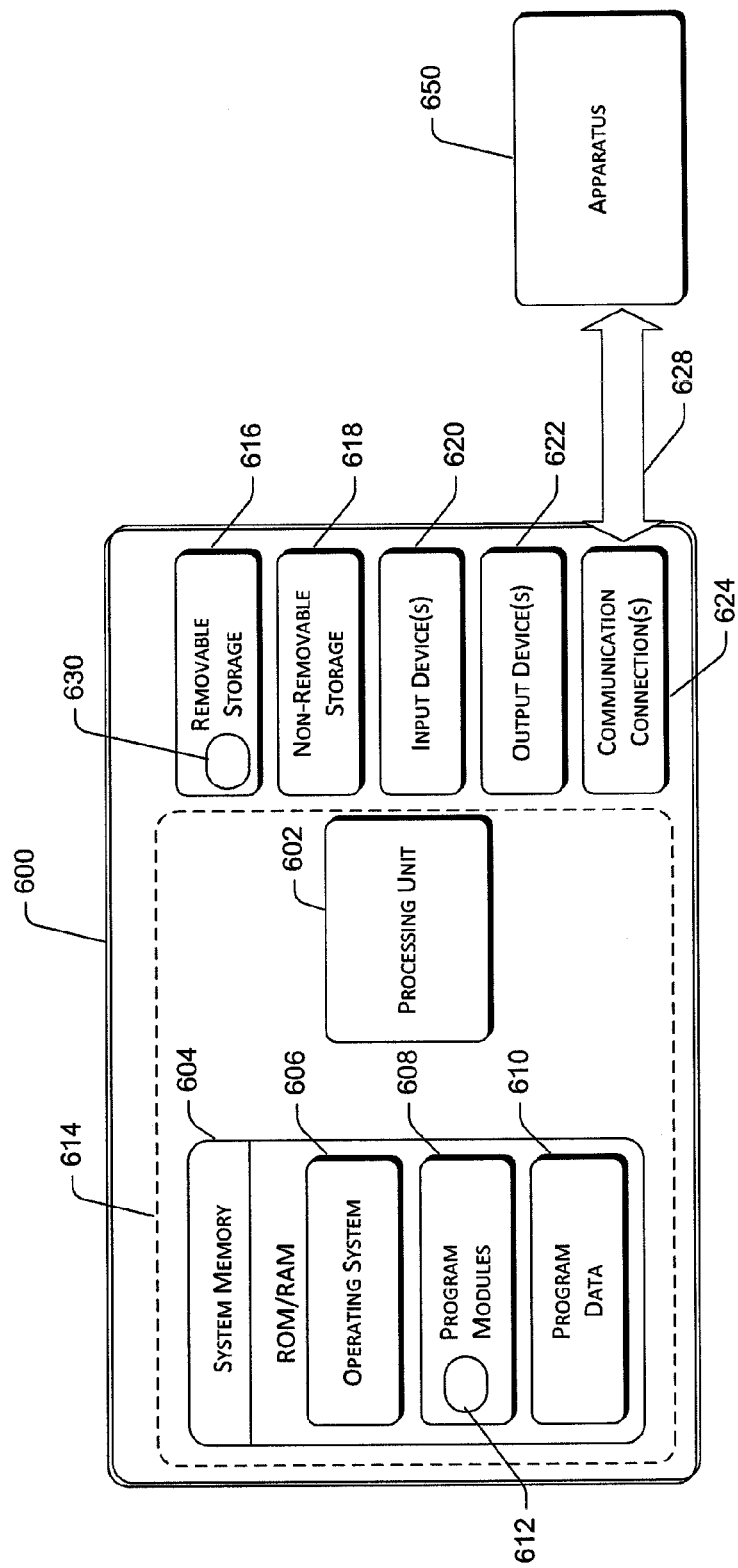
FIG. 6 shows an example computing device configured to implement operations of one or more embodiments of mobility management for a broadband wireless network for high-speed railway, arranged in accordance with embodiments described herein.

FIG. 6 shows an example computing device 600 that is configured to implement operations of one or more embodiments of self-adapted multi-antenna selection for broadband wireless access for a moving platform.

It will be readily appreciated that the techniques disclosed herein may be implemented in other computing devices, systems, and environments. The computing device 600 shown in FIG. 6 is one example of a computing device and not intended to suggest any limitation as to the scope of use or functionality of the computer and network architectures.

In at least one implementation, computing device 600 typically includes at least one processing unit 602 and system memory 604. Depending on the exact configuration and type of computing device, system memory 604 may be volatile (such as RAM), non-volatile (such as ROM, flash memory, etc.) or some combination thereof. System memory 604 may include an operating system 606, one or more program modules 608, and may include program data 610. A basic implementation of the computing device 600 may be demarcated by a dashed line 614. In at least one embodiment, computing device 600 may be a part of an MME, a radio base station associated with the MME, or a central office associated with the radio base station. In at least another embodiment, computing device 600 may be a computing device that is communicatively coupled to the mobility management entity, the radio base station, or the central office.

The program module 608 may include a module 612 configured to implement the technique of mobility management as described above. For example, the module 612 may include a set of computer-executable instructions or program codes that, when executed by the processing unit 602, may cause the processing unit 602 to carry out processing flows 300, 400 and/or 500, and any variations thereof, e.g., the computing device 600 performing the operations as described above with respect to processing flows 300, 400 and/or 500.

Computing device 600 may have additional features or functionality. For example, computing device 600 may also include additional data storage devices such as removable storage 616 and non-removable storage 618. In at least some implementations, the removable storage 616 and non-removable storage 618 are an example of computer accessible media for storing computer-executable instructions or program codes that are executable by the processing unit 602 to perform the various functions described above. Generally, any of the functions described with reference to the figures can be implemented using software, firmware, hardware (e.g., fixed logic circuitry) or a combination of these implementations. Program code may be stored in one or more computer accessible media or other computer-readable storage devices. Thus, the processes and components described herein may be implemented by a computer program product.

As mentioned above, computer accessible media includes volatile and non-volatile, removable and non-removable media implemented in any method or technology for storage of information, such as computer readable instructions, data structures, program modules, or other data. The terms "computer accessible medium" and "computer accessible media" refer to non-transitory storage devices and include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium that can be used to store information for access by a computing device, e.g., computing device 600. Any of such computer accessible media may be part of the computing device 600.

In one implementation, the removable storage 616, which is a computer accessible medium, has a set of computer-executable instructions 630 stored thereon. When executed by the processing unit 602, the set of computer-executable instructions 630 cause the processing unit 602 to execute operations, tasks, functions and/or methods as described above, including processing flows 300, 400 and/or 500 and any variations thereof.

Computing device 600 may also include one or more input devices 620 such as keyboard, mouse, pen, voice input device, touch input device, etc. Computing device 600 may additionally include one or more output devices 622 such as a display, speakers, printer, etc.

Computing device 600 may also include one or more communication connections 624 that allow the computing device 600 to communicate with apparatus 650 over network connection 628. Apparatus 650 may be an MME, a radio base station associated with the MME, or a central office associated with the radio base station. In such case, computing device 600 may be a computing device used by an operator to control operations of the MME, the radio base station, or the central office.

Upon executing the set of computer-executable instructions, whether stored in module 612 of program module 608 or in removable storage 616, processing unit 602 may direct computing device 600 or apparatus 650 to carry out a number of operations to implement the self-adapted multi-antenna selection technique as described above, including processing flows 300, 400 and/or 500 and any variations thereof.

It is appreciated that the illustrated computing device 600 is one example of a suitable device and is not intended to suggest any limitation as to the scope of use or functionality of the various embodiments described.

Additional and Alternative Implementation Notes

In the above description of exemplary implementations, for purposes of explanation, specific numbers, materials configurations, and other details are set forth in order to better explain the invention, as claimed. However, it will be apparent to one skilled in the art that the claimed invention may be practiced using different details than the exemplary ones described herein. In other instances, well-known features are omitted or simplified to clarify the description of the exemplary implementations.

The inventor intends the described exemplary implementations to be primarily examples. The inventor does not intend these exemplary implementations to limit the scope of the appended claims. Rather, the inventor has contemplated that the claimed invention might also be embodied and implemented in other ways, in conjunction with other present or future technologies.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts and techniques in a concrete fashion. The term "techniques," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

The exemplary processes discussed herein are illustrated as a collection of blocks in a logical flow graph, which represents a sequence of operations that can be implemented with hardware, software, firmware, or any combination thereof. In the context of software/firmware, the blocks represent instructions stored on one or more processor-readable storage media that, when executed by one or more processors, perform the recited operations. The operations of the exemplary processes may be rendered in virtually any programming language or environment including (by way of example and not limitation): C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2 ME, Java Beans, etc.), Binary Runtime Environment for Wireless (BREW), and the like.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

The term "processor-readable media" includes processor-storage media. For example, processor-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

For the purposes of this disclosure and the claims that follow, the terms "coupled" and "connected" may have been used to describe how various elements interface. Such described interfacing of various elements may be either direct or indirect.

The invention claimed is:

1. A method, comprising:
    grouping, by a computing device, a plurality of wireless communication devices on a moving platform into two or more non-overlapping groups of the plurality of wireless communication devices;

transmitting, by the computing device, a first list of tracking areas to the two or more non-overlapping groups;

in response to the moving platform entering into an overlapping region between a first tracking area and a second tracking area of the first list of tracking areas, transmitting, by the computing device, a second list of tracking areas to a first group of the two or more non-overlapping groups, wherein the first group changes the first list of tracking areas to the second list of tracking areas, and wherein the first list of tracking areas includes at least one different tracking area compared to the second list of tracking areas;

in response to the moving platform entering into an overlapping region between the second tracking area and a third tracking area of the first list of tracking area, transmitting, by the computing device, the second list of tracking areas to a second group of the two or more non-overlapping groups, wherein the second group changes the first list of tracking areas to the second list of tracking areas; and paging a wireless communication device, in response to an incoming data transmission for the wireless communication device, using a list of tracking areas that is currently associated with a group the wireless communication device was grouped into.

2. The method of claim 1, wherein the plurality of wireless communication devices comprises a plurality of active and idle wireless communication devices on the moving platform that are configured to communicate in accordance with the Long Term Evolution (LTE) standard.

3. The method of claim 1, wherein the grouping the plurality of wireless communication devices on the moving platform into the two or more non-overlapping groups of the wireless communication devices comprises:

allocating a respective Globally Unique Temporary Identifier (GUTI) to each of the plurality of wireless communication devices; and assigning each of the plurality of wireless communication devices to a respective group of the two or more groups by identifying each of the plurality of wireless communication devices with the respective GUTI.

4. The method of claim 1, further comprising:

in response to the moving platform entering into an overlapping region between the third tracking area of the first list of tracking areas and a fourth tracking area of the second list of tracking areas, transmitting, by the computing device a third list of tracking areas that is different from the first list and the second list of tracking areas to a third group of the two or more non-overlapping groups, wherein the third group changes the first list of tracking areas to the third list of tracking areas.

5. The method of claim 4, wherein in response to the moving platform entering into an overlapping region between the fourth tracking area and a fifth tracking area of the second list of tracking areas, the first group changes the second list of tracking areas to the third list of tracking areas.

6. The method of claim 5, further comprising:

in response to the moving platform entering into an overlapping region between the fifth tracking area of the second list of tracking areas and a sixth tracking area of the fourth list of tracking areas, transmitting, by the computing device, a fourth list of tracking areas that is different from the first, the second, and the third list of tracking area to the second group, wherein the second group changes the second list of tracking areas to the fourth list of tracking areas.

7. The method of claim 1, further comprising:

paging one or more base stations associated with one or more tracking areas of the first or second list of tracking areas in response to the moving platform entering a respective tracking area of the first or second list of tracking areas.

8. A non-transitory computer-readable medium storing instructions that, when executed, cause one or more processors of a computing device to perform operations comprising:

transmitting by the computing device to a plurality of non-overlapping groups of a plurality of wireless communication devices on a moving platform, a first list of tracking areas that are available for communication with the plurality of wireless communication devices, wherein respective wireless communication devices in each one of the plurality of non-overlapping groups are different from respective wireless communication devices in each other one of the plurality of non-overlapping groups;

transmitting, by the computing device, a second list of tracking areas to the plurality of non-overlapping groups, wherein the plurality of non-overlapping groups changes the first list of tracking areas to the second list of tracking areas for the plurality of non-overlapping groups in a sequential manner for one group of the plurality of non-overlapping groups at a time as the moving platform travels through one or more overlapping regions between one or more pairs of a plurality of tracking areas, wherein the first list of tracking areas includes at least one different tracking area compared to the second list of tracking areas; and paging a wireless communication device, in response to an incoming data transmission for the wireless communication device, using a list of tracking areas that is currently associated with a group the wireless communication device was grouped into.

9. The non-transitory computer-readable medium of claim 8, wherein the changing the first list of tracking areas to the second list of tracking areas for the plurality of non-overlapping groups in a sequential manner for the one group of the plurality of non-overlapping groups at the time as the moving platform travels through the one or more overlapping regions between the one or more pairs of the plurality of tracking areas comprises:

changing the first list of tracking areas to the second list of tracking areas for a first group of the plurality of non-overlapping groups in response to the moving platform entering into an overlapping region between a first tracking area and a second tracking area of the first list of tracking areas; and changing the first list of tracking areas to the second list of tracking areas for a second group of the plurality of non-overlapping groups in response to the moving platform entering into an overlapping region between the second tracking area and a third tracking area of the first list of tracking areas.

10. The non-transitory computer-readable medium of claim 9, further comprising:

in response to the moving platform entering into an overlapping region between the third tracking area of the first list of tracking areas and a fourth tracking area of the second list of tracking areas, transmitting, by the computing device, a third list of tracking areas that is different from the first list and the second list of tracking areas for a third group of the plurality of non-overlapping groups, wherein the third group changes the first list of tracking areas to the third list of tracking areas.

11. The non-transitory computer-readable medium of claim 10, wherein in response to the moving platform entering into an overlapping region between the fourth tracking area and a fifth tracking area of the second list of tracking areas, the first group changes the second list of tracking areas to the third list of tracking areas.

12. The non-transitory computer-readable medium of claim 11, further comprising:
in response to the moving platform entering into an overlapping region between the fifth tracking area of the second list of tracking areas and a sixth tracking area of the fourth list of tracking areas, transmitting, by the computing device, a fourth list of tracking areas that is different from the first, the second, and the third list of tracking area to the second group, wherein the second group changes the second list of tracking areas to the fourth list of tracking areas.

13. The non-transitory computer-readable medium of claim 8, further comprising:
paging one or more base stations associated with one or more tracking areas of the first or second list of tracking areas in response to the moving platform entering a respective tracking area of the first or second list of tracking areas.

14. The non-transitory computer-readable medium of claim 8, wherein the plurality of non-overlapping groups of the plurality of wireless communication devices comprises a plurality of active and idle wireless communication devices on the moving platform that are configured to communicate in accordance with the Long Term Evolution (LTE) standard.

15. A method, comprising:
identifying, by a computing device, a plurality of wireless communication devices on a moving platform as two or more non-overlapping groups of the plurality of wireless communication devices using respective Globally Unique Temporary Identifiers (GUTIs) of the plurality of wireless communication devices;
transmitting, by the computing device, a first list of tracking areas to the two or more non-overlapping groups;
transmitting, by the computing device, a second list of tracking areas to the two or more non-overlapping groups,
wherein the plurality of non-overlapping groups change the first list of tracking areas to the second list of tracking areas for the two or more non-overlapping groups in a sequential manner for one group of the two or more non-overlapping groups at a time as the moving platform travels through one or more overlapping regions between one or more pairs of a plurality of tracking areas, and
wherein the first list of tracking areas includes at least one different tracking area from the second list of tracking areas; and paging a wireless communication device, in response to an incoming data transmission for the wireless communication device, using a list of tracking areas that is currently associated with a group the wireless communication device was grouped into.

16. The method of claim 15, wherein the changing the first list of tracking areas to the second list of tracking areas for the two or more non-overlapping groups in a sequential manner for the one group of the two or more non-overlapping groups at the time as the moving platform travels through the one or more overlapping regions between the one or more pairs of the plurality of tracking areas comprises:
changing the first list of tracking areas to the second list of tracking areas for a first group of the two or more non-overlapping groups in response to the moving platform entering into an overlapping region between a first tracking area and a second tracking area of the first list of tracking areas; and
changing the first list of tracking areas to the second list of tracking areas for a second group of the two or more non-overlapping groups in response to the moving platform entering into an overlapping region between the second tracking area and a third tracking area of the first list of tracking areas.

17. The method of claim 16, further comprising:
in response to the moving platform entering into an overlapping region between the third tracking area of the first list of tracking areas and a fourth tracking area of the second list of tracking areas, transmitting, by the computing device, a third list of tracking areas that is different from the first list and the second list of tracking areas for a third group of the plurality of non-overlapping groups, wherein the third group changes the first list of tracking areas to the third list of tracking areas.

18. The method of claim 17, wherein in response to the moving platform entering into an overlapping region between the fourth tracking area and a fifth tracking area of the second list of tracking areas, the first group changes the second list of tracking areas to the third list of tracking areas.

19. The method of claim 18, further comprising:
in response to the moving platform entering into an overlapping region between the fifth tracking area of the second list of tracking areas and a sixth tracking area of the fourth list of tracking areas, transmitting, by the computing device, a fourth list of tracking areas that is different from the first, the second, and the third list of tracking area to the second group, wherein the second group changes the second list of tracking areas to the fourth list of tracking areas.

20. The method of claim 15, wherein the plurality of wireless communication devices comprises a plurality of active and idle wireless communication devices on the moving platform that are configured to communicate in accordance with the long Term Evolution (LTE) standard.

* * * * *